Patented Oct. 25, 1932

1,884,619

UNITED STATES PATENT OFFICE

CAMILLE DREYFUS, OF NEW YORK, N. Y., AND JACQUES SCHEIDEGGER, OF CUMBERLAND, MARYLAND, ASSIGNORS TO CELANESE CORPORATION OF AMERICA, A CORPORATION OF DELAWARE

DERIVATIVES OF CELLULOSE COMPOSITIONS OF LOW INFLAMMABILITY CONTAINING CINNAMIC ACID DIBROMIDE

No Drawing.  Application filed June 13, 1928. Serial No. 285,208.

This invention relates to the production of coating compositions, films or plastic compositions containing derivatives of cellulose and particularly organic derivatives of cellulose which have a low degree of inflammability imparted thereto by the addition of halogen derivatives of aromatic compounds containing an unsaturated side chain.

An object of our invention is to provide compositions containing derivatives of cellulose and particularly organic derivatives of cellulose such as cellulose acetate, which compositions have their inflammability greatly diminished by the addition thereto of halogen derivatives of aromatic compounds containing an unsaturated side chain. Other objects of our invention will appear from the following detailed description.

We have found that if halogen derivatives of aromatic compounds containing an unsaturated side chain and particularly bromine derivatives of such compounds such as cinnamic acid diabromide, are added to compositions containing derivatives of cellulose such as cellulose nitrate, and particularly organic derivatives of cellulose, the inflammability of the resultant product is reduced to a very great extent. While the other halogen derivatives of aromatic compounds containing an unsaturated side chain may be used, we prefer the bromine derivatives because they are more efficacious as fire retardants than the chlorine compounds, and are considerably cheaper than the iodine compounds. One of the advantages of the use of these bromine derivatives is the fact that with relatively small quantities of these bromine derivatives, a maximum fire-retardant effect is obtained.

In accordance with our invention a composition is made containing a suitable derivative of cellulose, a halogen derivative of an aromatic compound containing an unsaturated side chain and a suitable volatile solvent for the mixture. If desired medium and/or high boiling solvents, plastifiers, pigments, or other effect materials may be added to the composition to impart such properties as are desired in the finished product, as is well understood in the liquid coating and plastic composition arts. The amount of solvent used will vary with the purpose to which the composition is to be put. Thus if films are to be made, 300 to 600 parts of a volatile solvent such as acetone, will be used to 100 parts of a cellulose derivative. If a lacquer is to be prepared, a larger quantity of the volatile solvent will be used; whereas, if a plastic composition is to be made, the amount of volatile solvent will be considerably reduced, only such quantities being used as are necessary to form plastic compositions of the plasticity to work them into desired shapes.

Of the derivatives of cellulose that may be used, cellulose nitrate, the organic esters of cellulose or the cellulose ethers may be mentioned. Examples of organic esters of cellulose are cellulose acetate, cellulose formate, cellulose propionate, cellulose butyrate, while examples of cellulose ethers are ethyl cellulose, methyl cellulose and benzyl cellulose. Any one or mixture of two or more of these organic derivatives of cellulose may be used in the preparation of the composition. Because of its ease of manufacture and its many desirable properties, we prefer to use cellulose acetate.

Any of the well known solvents of organic derivatives of cellulose may be employed, of which the following are examples: acetone, ethylene dichloride, ether, benzene, toluene, ethyl acetate, ethyl lactate, tetrachlorethan, etc.

When plastifiers are used, such materials as triacetin, mono methyl xylene sulphonamide, para toluene sulphonanilide, diethyl phthalate, dibutyl phthalate, or dibutyl tartrate, which are not of themselves fire retardants, may be employed. Morever, other plastifiers which have marked fire retardant properties such as triphenyl phosphates or tricresyl phosphates, may be employed to impart plasticity and some degree of fire resistance to the finished article.

Since the proportions of ingredients to be used in making coating compositions, films or plastic compositions may be varied as is well understood in the art, specific proportions of these ingredients will not be given.

As stated before this invention relates to a composition containing derivatives of cellulose which have fire resisting properties imparted thereto by the use of halogen derivatives of aromatic compounds having an unsaturated side chain. The term "aromatic compounds containing an unsaturated side chain" as used in the specification and also in the claims includes hydrocarbons, such as styrol, $C_6H_5CH:CH_2$; alcohols, such as cinnamyl alcohol, $C_6H_5CH:CH\ CH_2OH$; aldehydes such as cinnamaldehyde, $H_6C_5 CH:CH\ CHO$; and acids, such as cinnamic acid, $C_6H_5CH:CH\ COOH$. As stated above, the chlorine or iodine derivatives of these compounds may be used, but we prefer to employ the bromine derivatives. Because of its ease of preparation and its highly desirable fire retardant properties, we prefer to use the cinnamic acid dibromide.

As to the relative proportions of the foregoing bromine derivatives of aromatic compounds containing an unsaturated side chain that may be used in the preparation of the coating or plastic compositions containing derivatives of cellulose, this will vary with the nature of the specific fire retardant used and the judgment of the operator. While it may be stated roughly that the proportion of fire retardant to be used will vary from 5 to 40% of the weight of the cellulose derivative employed, the exact amount to be used must be predetermined to suit the particular requirements, the fire retardant properties of the specific compounds used and the cost of the materials. By way of example, it is pointed out that where cinnamic acid dibromide ($C_6H_5CH\ Br\ CH\ Br\ COOH$) is employed, we have found that from 10 to 15% of this material based on the weight of the cellulose acetate used, is sufficient to produce the required fire retardant properties in films formed from compositions containing them. We have found that if the amount of cinnamic acid dibromide exceeds 20% of the weight of the cellulose acetate, no appreciable increase in fire resisting properties is found in the material. However, this invention includes the use of less than 10% or more than 20% of cinnamic acid dibromide.

Since many of the halogen derivatives of aromatic compounds containing an unsaturated side chain are themselves plasticizers, if other plasticizers are used in making the plastic or liquid coating compositions, the amount of the other plasticizers that are employed can be decreased in proportion to the amount of fire retardant, herein described, are used.

One mode of preparing the cinnamic acid bromide is to dissolve cinnamic acid in carbon bisulphide and then add a solution of the theoretical amount of bromine required in carbon bisulphide. The bromide is instantly absorbed, and upon evaporation, the cinnamic acid bromide is obtained in the form of white crystals.

Films produced from solutions containing cellulose acetate and cinnamic acid dibromide in amounts equal in weight to 12% of the cellulose acetate used, are strong, transparent, flexible, tough and light fast. When such films are ignited by a flame they cease to burn when the flame is removed, and will not reignite until they are again brought in contact with the flame.

It is to be understood that the foregoing detailed description is given merely by way of illustration and that many variations may be made therein without departing from the spirit of our invention.

Having described our invention, what we claim and desire to secure by Letters Patent is:

1. A composition of matter containing a derivative of cellulose and a cinnamenyl dihalide compound.
2. A composition of matter containing a derivative of cellulose and a cinnamenyl dibromide compound.
3. A composition of matter containing a derivative of cellulose and a cinnamic acid dibromide.
4. A composition of matter containing an organic derivative of cellulose and a cinnamenyl dihalide compound.
5. A composition of matter containing an organic derivative of cellulose and a cinnamenyl dibromide compound.
6. A composition of matter containing an organic derivative of cellulose and cinnamic acid dibromide.
7. A composition of matter containing cellulose acetate and a cinnamenyl dihalide compound.
8. A composition of matter containing cellulose acetate and a cinnamenyl dibromide compound.
9. A composition of matter containing cellulose acetate and cinnamic acid dibromide.
10. A composition of matter containing cellulose acetate and cinnamic acid dibromide in amounts equal to 10 to 20% of the cellulose acetate.
11. A composition of matter containing cellulose acetate and cinnamic acid dibromide in amounts equal to about 15% of the cellulose acetate.
12. A plastic composition containing an organic derivative of cellulose, a solvent and a cinnamenyl dibromide compound.
13. A plastic composition containing cellulose acetate, a solvent and cinnamic acid dibromide.

In testimony whereof, we have hereunto subscribed our names.

CAMILLE DREYFUS.
JACQUES SCHEIDEGGER.